United States Patent
Beaven et al.

(10) Patent No.: US 9,354,870 B2
(45) Date of Patent: May 31, 2016

(54) MAINTAINING INTEGRITY OF OUTPUT OF CODE GENERATORS

(71) Applicant: INTERNATIONAL BUSINESS MACHINES CORPORATION, Armonk, NY (US)

(72) Inventors: John A. Beaven, Eastleigh (GB); Rajasinghe S. Gunaratne, Southampton (GB); Robert J. Maddison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 14/032,839

(22) Filed: Sep. 20, 2013

(65) Prior Publication Data

US 2014/0115559 A1    Apr. 24, 2014

(30) Foreign Application Priority Data

Oct. 23, 2012  (GB) .................................. 1219023.7

(51) Int. Cl.
G06F 9/44 (2006.01)

(52) U.S. Cl.
CPC .. *G06F 8/74* (2013.01); *G06F 8/20* (2013.01); *G06F 8/35* (2013.01); *G06F 8/30* (2013.01); *G06F 8/31* (2013.01); *G06F 8/71* (2013.01)

(58) Field of Classification Search
CPC ............... G06F 8/20; G06F 8/30; G06F 8/31; G06F 8/36; G06F 8/71
See application file for complete search history.

(56) References Cited

U.S. PATENT DOCUMENTS

| | | | |
|---|---|---|---|
| 6,604,110 B1 | 8/2003 | Savage et al. | |
| 7,035,866 B1* | 4/2006 | Chen et al. ............................ | 1/1 |
| 7,533,365 B1 | 5/2009 | Hogstrom et al. | |
| 8,010,578 B2 | 8/2011 | Laflen et al. | |
| 8,024,688 B1 | 9/2011 | Trimberger | |
| 8,364,651 B2* | 1/2013 | Howey .......................... | 707/692 |
| 2001/0042067 A1 | 11/2001 | Dayani-Fard et al. | |
| 2002/0016954 A1* | 2/2002 | Charisius et al. ................. | 717/2 |

(Continued)

FOREIGN PATENT DOCUMENTS

CN    102446099 A    5/2012
EP    1001338 A2    5/2000

OTHER PUBLICATIONS

Wu et al., "A Solution Based on Modeling and Code Generation for Embedded Control System", 2009 SciRes, Jul. 4, 2009, pp. 160-164; <dx.doi.org/10.4236/jsea.2009.23023>.*

(Continued)

*Primary Examiner* — Thuy Dao
*Assistant Examiner* — Ben C Wang
(74) *Attorney, Agent, or Firm* — Law Office of Jim Boice (57) ABSTRACT

A processor-implemented method, system, and/or computer program product maintain integrity of output of a code generator. One or more processors determine a generated output that has been generated by a specific code generation application based on an original model, where the original model is a structured model used to construct a software program. The generated output is analyzed to infer contents of an inferred version of the original model. The inferred version of the original model is compared with a current version of the original model to detect differences in source elements. Detected differences are thus used to identify redundant elements in the generated output.

20 Claims, 4 Drawing Sheets

(56) References Cited

U.S. PATENT DOCUMENTS

| | | | |
|---|---|---|---|
| 2002/0129060 A1* | 9/2002 | Rollins et al. | 707/513 |
| 2006/0161888 A1* | 7/2006 | Lovisa et al. | 717/107 |
| 2006/0294526 A1* | 12/2006 | Hambrick et al. | 719/315 |
| 2007/0088740 A1* | 4/2007 | Davies et al. | 707/103 R |
| 2007/0234278 A1 | 10/2007 | Damm et al. | |
| 2008/0201690 A1* | 8/2008 | Lovisa et al. | 717/107 |
| 2008/0295092 A1* | 11/2008 | Tan et al. | 717/178 |
| 2009/0144696 A1* | 6/2009 | Andersen | 717/109 |
| 2009/0327324 A1* | 12/2009 | Laflen et al. | 707/101 |
| 2010/0077386 A1* | 3/2010 | Akkiraju et al. | 717/136 |
| 2010/0125827 A1* | 5/2010 | Francis et al. | 717/109 |
| 2010/0198844 A1* | 8/2010 | Ribbe et al. | 707/755 |
| 2010/0242015 A1* | 9/2010 | Stenberg et al. | 717/106 |
| 2010/0242017 A1* | 9/2010 | Stenberg et al. | 717/111 |
| 2011/0010687 A1 | 1/2011 | Plante | |
| 2011/0023014 A1* | 1/2011 | Harper et al. | 717/108 |
| 2011/0060895 A1* | 3/2011 | Solomon | 713/1 |
| 2011/0066999 A1* | 3/2011 | Rabinovich et al. | 717/104 |
| 2011/0088011 A1* | 4/2011 | Ouali | 717/105 |
| 2011/0197174 A1 | 8/2011 | Wu et al. | |
| 2011/0231828 A1 | 9/2011 | Kaulgud et al. | |
| 2013/0212682 A1* | 8/2013 | McClure et al. | 726/25 |
| 2014/0380270 A1* | 12/2014 | Lovisa et al. | 717/107 |

OTHER PUBLICATIONS

Wang et al., "Automatic Generation of SystemC Models from Component-based Designs for Early Design Validation and Performance Analysis", 2008 ACM, WOSP'08, Jun. 2008, pp. 139-143; <http://dl.acm.org/citation.cfm?id=1383577&CFID=756931351&CFTOKEN=93270414>.*

Cláudio et al., "A Framework for Modeling, Building and Maintaining Enterprise Information System Software", Oct. 2009 IEEE, pp. 115-125; <http://ieeexplorejeee.org/stamp/stamp.jsp?tp=&arnumber=5336108>.*

International Searching Authority: International Search Report and Written Opinion for International Application No. PCT/IB2013/054818, Mailed Nov. 21, 2013.

GB Patent Application No. GB1219023.7—Search Report Mailed March 11, 2013.

IBM Corporation, "Rational Rhapsody User Guide", IBM Corporation, 2009, pp. 1-1626 (Relevant pp. 87, 883, 912, 926, 1044, 1404, 1507).

A. Mishra, "Reverse Engineering: The Promising Technology", Covenant University Conference Proceedings, SEIS 2010, pp. 1-25.

E. Stroulia et al., "User Interface Reverse Engineering in Support of Interface Migration to the Web", Kluwer Academic Publishers, Automated Software Engineering, 2003, 10, pp. 271-301.

Sparx Systems, "Enterprise Architect 9.3: Reviewer'S Guide", Sparx Systems, 2012, pp. 1-32.

J. Lee et al., "TIE: Principled Reverse Engineering of Types in Binary Programs", The Internet Society, Proceedings of the Network and Distributed System Security Symposium, NDSS 2011, San Diego, California, USA, Feb. 6-9, 2011, pp. 1-18.

* cited by examiner

MAINTAINING INTEGRITY OF OUTPUT OF CODE GENERATORS

This application is based on and claims the benefit of priority from Great Britain (UK) Patent Application 1219023.7, filed on Oct. 23, 2012, and herein incorporated by reference in its entirety.

BACKGROUND

This invention relates to the field of code generation. In particular, the invention relates to maintaining the integrity of the output of code generators.

Code generation or automatic programming describes a process whereby some form of "model" (for example, captured in XML) is interpreted by a code generator and converted into program code and other resources.

SUMMARY

A processor-implemented method, system, and/or computer program product maintain integrity of output of a code generator. One or more processors determine a generated output that has been generated by a specific code generation application based on an original model, where the original model is a structured model used to construct a software program. The generated output is analyzed to infer contents of an inferred version of the original model. The inferred version of the original model is compared with a current version of the original model to detect differences in source elements. Detected differences are thus used to identify redundant elements in the generated output.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

As described above, code generation or automatic programming describe a process whereby some form of "model" (for example, captured in XML) is interpreted by a code generator and converted into program code and other resources.

For example, a model may capture information such as the name of a database table plus fields within that table. A code generation application may then create Structured Query Language (SQL) statements for defining these elements within particular types of database, together with Java (Java is a trade mark of Sun Microsystems, Inc.) code for programmatically retrieving and modifying their values.

The attraction of code generators is that they offer the ability to quickly and consistently create (typically complex) output based on (typically simple) input in a way that encapsulates specific knowledge and best practices and also prevents costly, time-consuming mistakes being introduced by human error. Users of a code generation application can, for example, easily and reliably define database tables without the need to become experts in various database technologies.

However, an intrinsic problem with code generators is that they operate in a "write only" mode; they emit output but do not maintain it. So if an item is removed (or renamed) from a model, then output that relates to it from a previous code generation remains, even though it no longer forms part of the model. This results in the build-up of redundant clutter that then introduces errors where it interferes with more recent output.

As code generators become more commonly used to create high quality, complex code from simplified user interfaces, the ability to maintain consistency between the source and output is likely to become an increasing concern that potentially inhibits take-up of code generation technology.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In accordance with one embodiment, a method and system are provided for reverse engineering of code generation processes such that files on the file system (and/or their content) may be used to infer source model content with a very high degree of reliability. This inferred model content may then be compared against any current models in order to detect changes that have been applied since the code generation. Based on this knowledge, redundant generated resources can be "cleaned" (archived and/or deleted) in order to ensure consistency between the current source model and the generated code.

A framework is presented that can process defined rules and delegating to custom logic as required, for the purpose of reverse engineering the contents of the file system in order to infer: a) material that is the output of a specific code generation application; and b) subsets of that material that represent redundant clutter and may thus be automatically removed.

Reverse engineering generated code in order to infer the source model exploits the fact that code generators follow predictable rules with regard to the naming and/or content of the generated output and also inject information defined in the original source into the output. For the example mentioned above, this would include table and field names injected into files that conform to conventional SQL and Java syntax. Notably, they do not output arbitrarily structured or random data.

It is possible therefore, by using the present invention, to define rules that describe specific types of generated output and to compare any file to such a rule and determine with a high degree of accuracy whether or not it is (or contains) output from a code generator and whether or not source elements injected into it still exist in a source model.

If it can be determined that a file, or some part of its content, represents output from a specific code generation application and that any of the original source elements are no longer present (due to being deleted or renamed), then that item of output represents redundant clutter that can be removed.

The described method and system retrospectively ensures the integrity of generated output by inferring the original source material from customizable rules.

In practice, however performing this task must overcome performance difficulties as potentially all files in the file system must be examined, and must also avoid false positives in the form of data that resembles generated code but is not.

Figure 1:
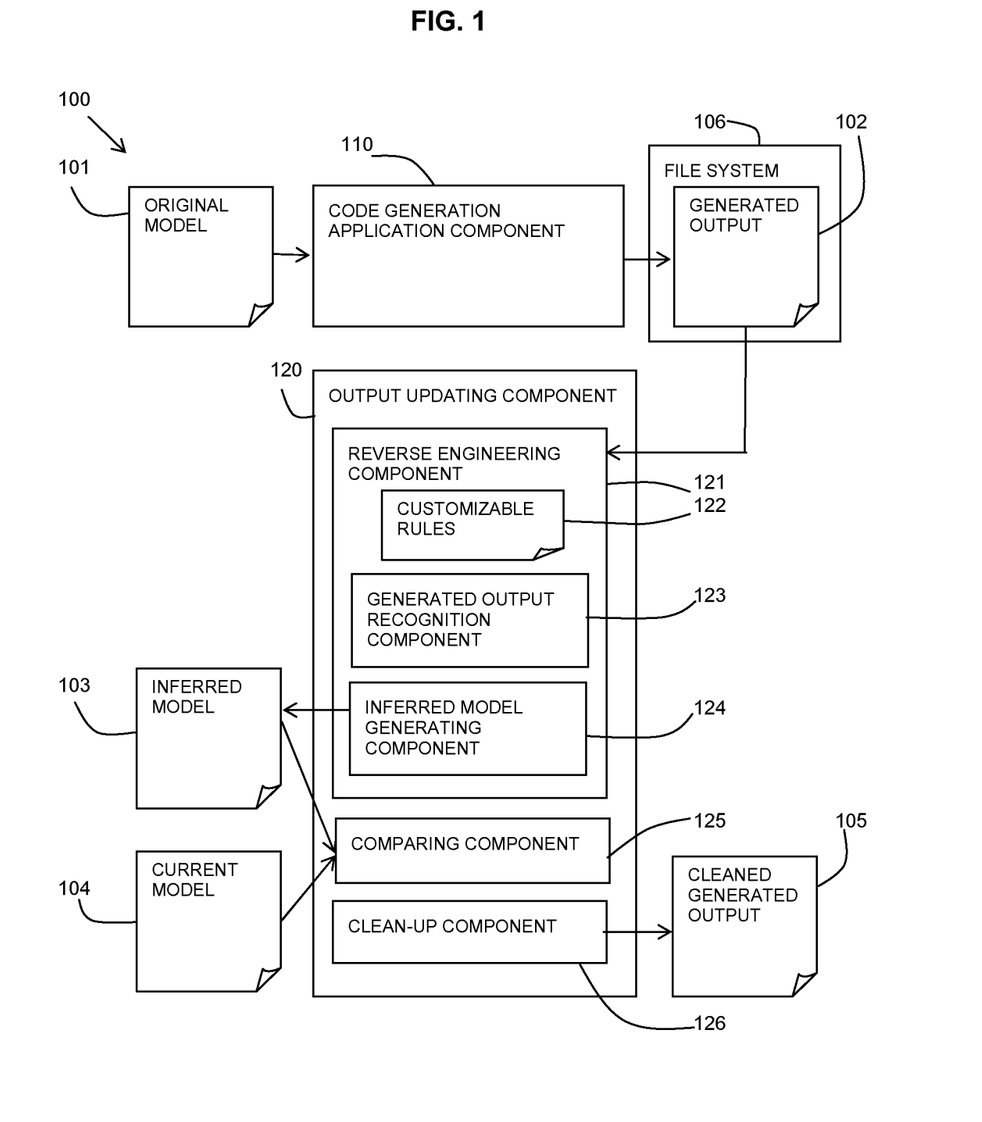
FIG. 1 is block diagram of an example embodiment of a system in accordance with the present invention.

Referring now to the figures, and in particular to FIG. 1, a block diagram shows an example embodiment of the described system 100. In one embodiment, some or all of the components, including but not limited to code generation application component 110, output updating component 120, and/or all components (121, 123, 124, 125, and 126) within output updating component 120 are implemented as hardware components.

An original model 101 may be provided from which a code generation application component 110 generates a generated output 102 in the form of program code or resources.

The described method provides an output updating component 120 for maintaining the integrity of generated output 102. The output updating component 120 may be integral to the code generation application or may be separate from it.

The code updating component 120 may include a reverse engineering component 121 in the form of a rules engine with customizable rules 122 which enable the reverse engineering of generated output 102 for a code generation application component 110. The customizable rules 122 may be generated for specific types of generated output. Code generation application component 110 often follows rules for generating program code or resources and also injects information from the original model 101 into the output. Such rules may be used to customize the rules of the reverse engineering component 121.

The reverse engineering component 121 may take as input files or content of a file system 106 within which there may be a generated output 102. The reverse engineering component 121 may include a generated output recognition component 123 for determining that a file, code, or content, represents output from a specific code generation application component 110. The output recognition component 123 may do this using the customizable rules 122.

The reverse engineering component 121 may also include an inferred model generating component 124 for generating content and structure of an inferred model 103 from the generated output 102 using the customizable rules 122. The customizable rules 122 provide the information necessary to infer what the original model must have looked like based on the detected generated output 102.

In an ideal case, an inferred model 103 may be created that is identical to the original model 101 in every detail. In practice, there might be differences, for example, documentation in the original model might not be present in the generated material and so would not be re-produced in the inferred model 103. However, unless there is ambiguity in the generated output 102, it will be possible to build an inferred model 103 that contains enough content to: a) compare against a current view of the model 104; or b) actually re-create the generated output 102.

The output updating component 120 may include a comparing component for comparing the content of the inferred model 103 with a current model 104 corresponding to the original model 101. The comparing component 125 may detect any changes that have been applied to the original model 101 since the generated output 102 was created.

The output updating component 120 may include a cleanup component 126 for archiving and/or deleting any now redundant components of the generated output 102 to provide a cleaned generated output 105.

Figure 2:
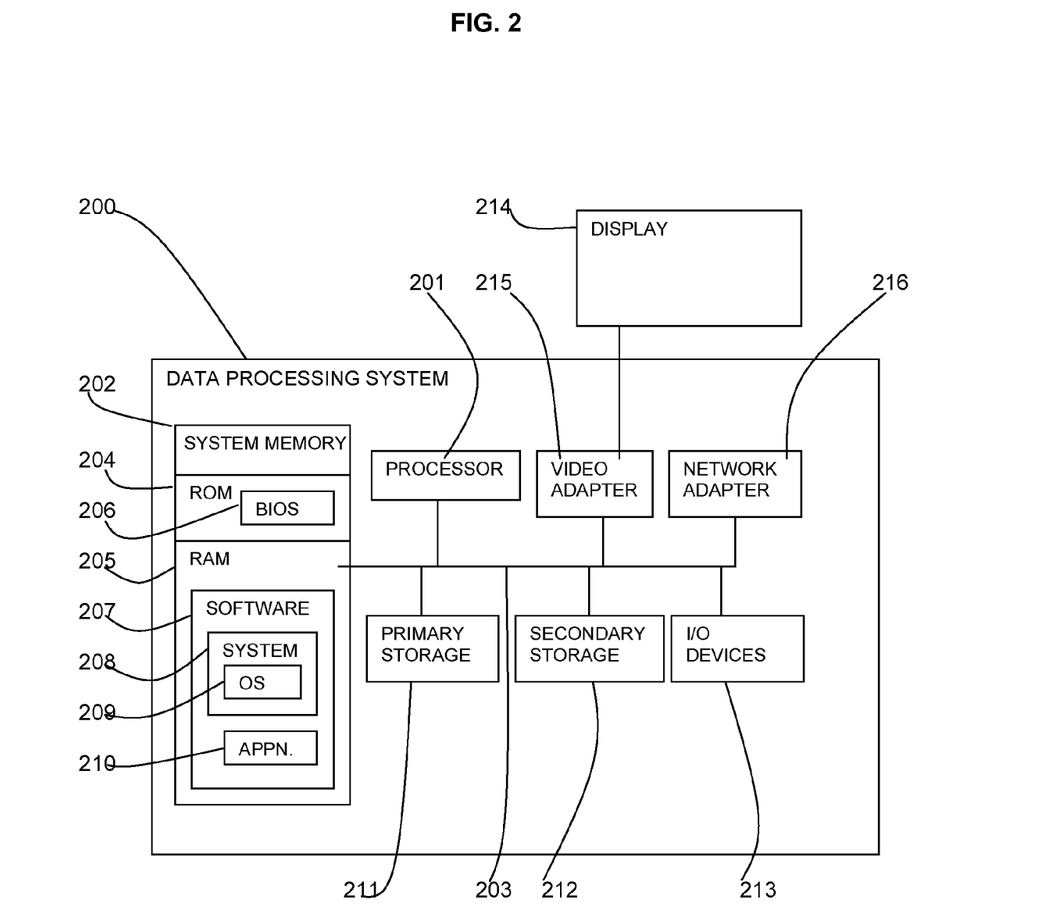
FIG. 2 is a block diagram of an embodiment of a computer system in which the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements may include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 may be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
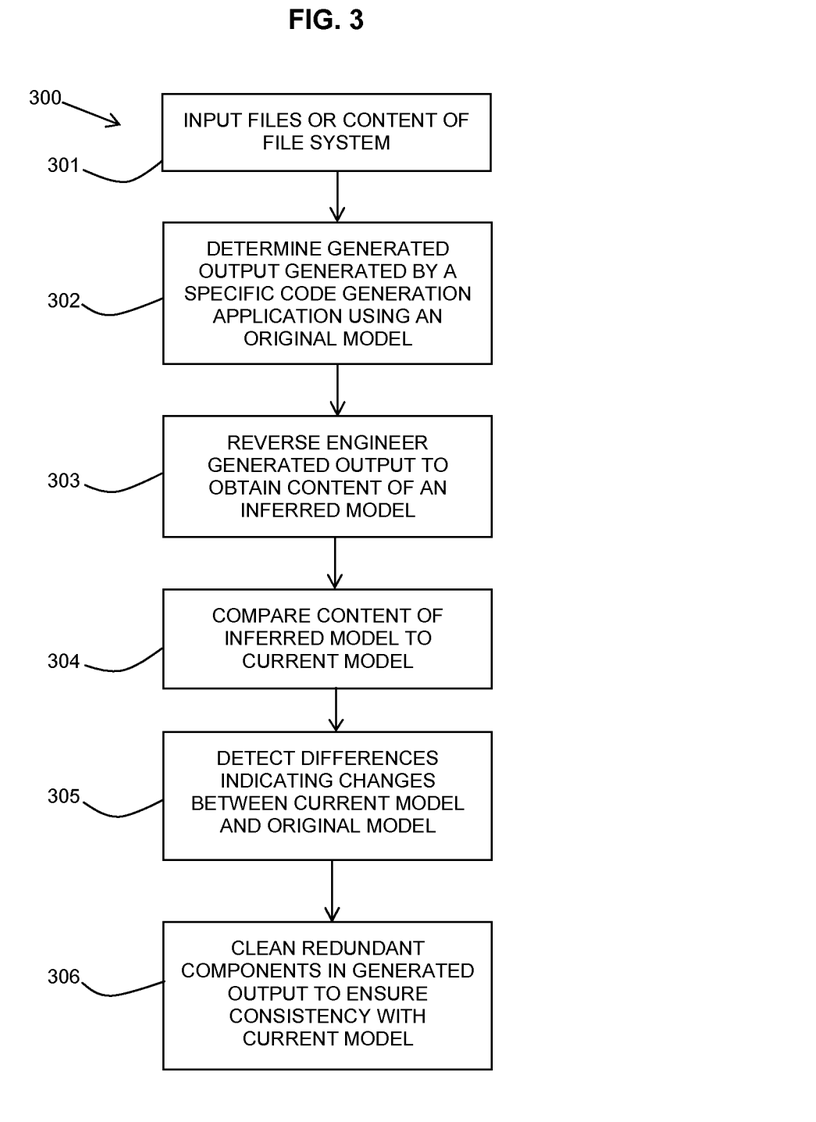
FIG. 3 is a flow diagram of an example embodiment of an aspect of a method in accordance with the present invention.

Referring to FIG. 3, a flow diagram 300 shows an embodiment of the described method for maintaining the integrity of output generated by a code generation application.

Files or contents of a file system may be used as an input 301 within which is generated output to be updated. The generated program output that is aimed to be updated may have been generated by a specific code generation application which is based on an original model.

The method is not restricted to a particular product. Any case where some source material (like the model) is used to generate some target material (like the files) may make use of the described method.

Generated output may be determined 302 to be material which is the output of the specific code generation application and which is generated from the source model. This determination may be carried out by reverse engineering the files or contents of a file system using defined customized rules. The customizable rules may provide the information necessary to infer what the original model must have looked like based on the detected generated output.

For example, this determination may be carried out by scanning and matching the contents of the file system for matches on fully qualified file name patterns. By fully qualified, files and not directories may be located. For example, a match may be found for a file called "/a/b/c/d/file.java" but the directory "a/b/c/d" would not be allowed (and hence implicitly its content) to be matched. The reason is that it is not possible to know what exactly was in a directory (without reading all the files) and hence be able to say for sure that that directory itself and all its content were all generated from some specific source model. Therefore, the method works at the individual file level, hence the term "fully qualified".

The scanning and matching may make use of embedded named wildcards.

A wildcard might be a star character such as Hello*World. This would match any string starting with Hello and ending with World (e.g. HelloThereWorld). A wild card may be provided in the described method with the ability to determine the value of the string the wildcard replaced. Therefore, the wild cards may be given names to identify them. In the above example, Hello%WildCard1%World might be used. The name of the wild card is "WildCard1" and is interpreted as a wild card because of the enclosing % characters. The matching algorithm may keep track of the value of these wild cards. For example, when matching HelloThereWorld, the value of "WildCard1" is "There". This provides a convenient separation between the matching code and logic used to examine match hits.

Sophisticated open-ended wildcard matching may also be used that can span multiple folders e.g. C:\%%whoknowswhere%%\Wibble.txt might locate files named Wibble.txt and return values such as "whoknowswhere=myDir\\A\B\C\ someOtherDir" "whoknowswhere=myDir\X\Y" etc.

Compliance with additional directives in a rule may be checked, for example, for the presence of "signature" words or phrases.

This may include checking inside files to confirm that certain expected content is present. For example, a file may be generated, AlphaBusinessObject.java, in response to the existence of an entity in the original model called "Alpha". A file, BetaBusinessObject.jar, may be encountered in the same location. This file might be present because there used to be an equivalent object "Beta" in the original model or it may be an unrelated user file. Before incorporating this into the inferred model, the content of the file may be examined to check that it contains generated content. Checks may be made for specific keywords, strings, chunks of text, and deliberately generated markers that allow the method to ensure that the file was generated.

The generated output may be reverse engineered 303 according to customized rules relating to the specific code generation application that generated it, to obtain content of an inferred model. The inferred model is a reverse engineered model of the source model on which the specific generation application was based to generate the generated output. The inferred model may include inferred source elements of named variables populated by the scanning and matching process of step 302.

The contents of the inferred model may be compared 304 to the contents of a current model which is an up-to-date version of the original model from which the generated program code or resource was generated by the specific code generation application.

In one embodiment, both the contents and the structure of the inferred model may be compared to the contents and structure of the current model, and an extract structural and content match may be required. How the comparison is carried out is dependent on the semantics of the model itself. In another embodiment, the inferred model and current model may be semantically comparable, but with different structures.

Any differences between the content of the inferred model and the content of the current model may be detected 305. For example, source elements inferred from the named variables populated by the scanning and matching process are attempted to be resolved in the current model (including any sub-model portions). Any that cannot be resolved indicate that the associated file or part thereof is redundant and may be automatically cleaned.

The scanning and matching process may locate redundant artefacts for a particular type of model (as defined by the rules) but it could find material pertaining to a number of separate instances of a type of model and is able to identify which models are applicable to which redundant artefacts.

Figure 4:
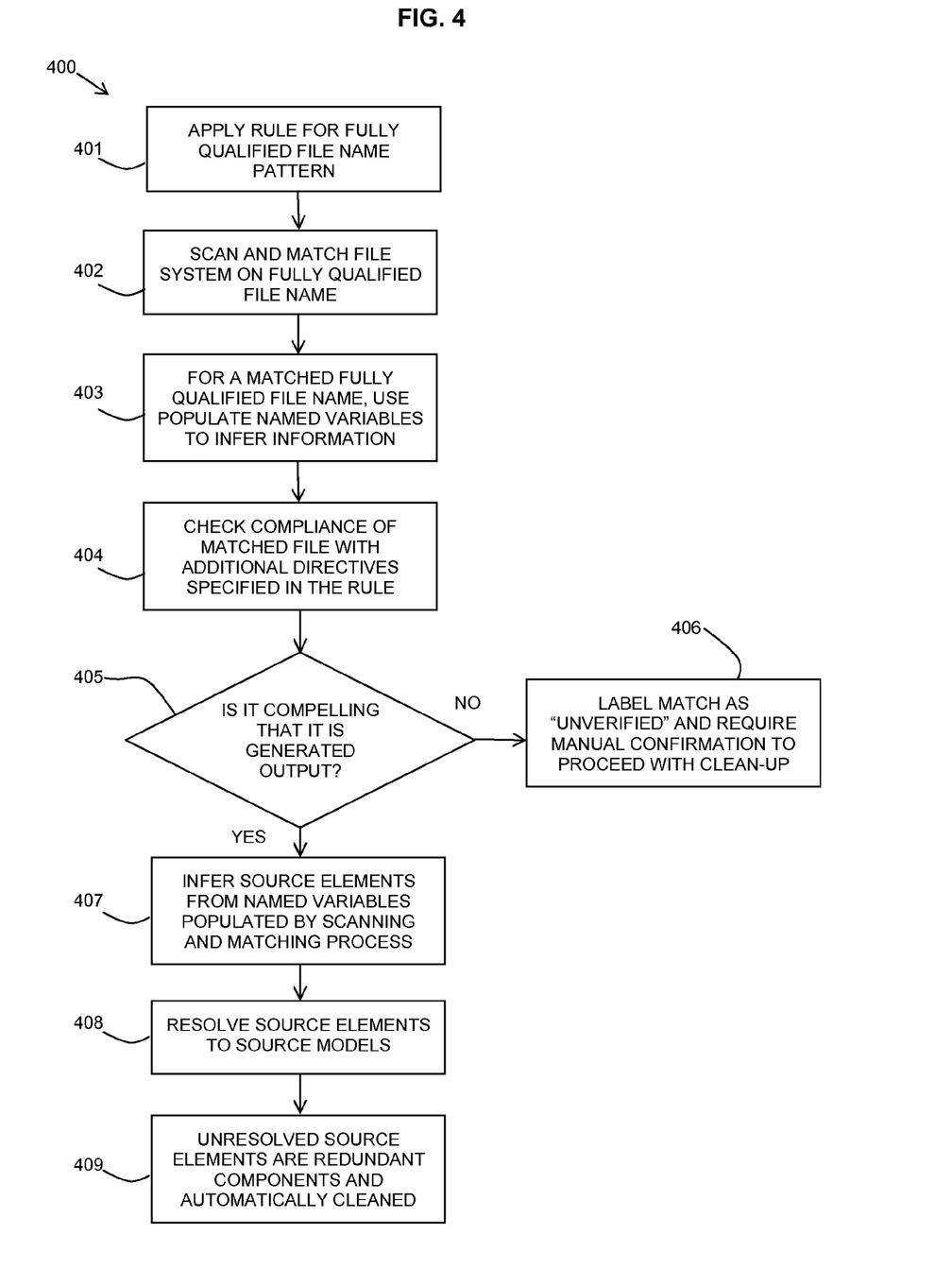
FIG. 4 is a flow diagram of an example embodiment of a further aspect of a method in accordance with the present invention.

In a first embodiment of the described method shown in FIG. 4, a rule by rule approach may be used where the file system is scanned for each rule and the inferred model is partially created in memory to allow the comparison for that rule to take place. In a second embodiment, the entire model may be constructed in memory and then a direct model to model comparison may be carried out.

A first embodiment of the aspect of the described method of determining generated output and detecting redundant components is described with reference to the flow diagram 400 of FIG. 4.

A rule of the reverse engineering component may be applied 401 to recognize a fully qualified file name pattern in input files or content of a file system.

The input files or content of a file system may be scanned 402 to match fully qualified file names as defined in the rules.

Once a matched fully qualified file name is located, the populated named variables are used 403 to infer information. Compliance may be checked 404 of the matched file with any additional directives specified in the rules, for example, a "signature" content.

It is determined 405 if it is compelling that the matched file is generated output generated by a specific generation application for which the rules have been customized. If there is some doubt, then the matched file may be labeled 408 as "unverified" and manual confirmation may be required in order to proceed with a clean-up of that file.

If it is compelling that the matched file is generated output, then source elements may be inferred 407 from the named variables populated by the scanning and matching process. The inferred source elements may be resolved 408 to current source models.

Any unresolved source elements are redundant components and may be automatically cleaned 409 from the matched file.

An example of a rule for identifying generated output using the method of the first embodiment is given below.

It may be specified (for example, using standard Extensible Markup Language (XML)) that the "shape" of fully qualified output file names are as follows:

```
<ruleString>%Project%/src/%%Package%Name%/entity/
E%EntityExtension%Ext.java</ruleString>
```

This is intended to identify a top level folder that maps to a source "Project", an immediate sub-folder named "src" followed by a sub folder structure of indeterminate length mapped to an element called "PackageName", and ultimately a file whose name indirectly maps to an "EntityExtension" element.

It may also be specified that any files matching this pattern must also directly implement one of two specific classes (the pattern already defines it as a Java file) and contain some arbitrary "signature" that further indicates the file has been generated:

```
<implements>com.ibm.common.IExtension |
com.ibm.base.IBaseExtension</implements>
<containsString><!-- ExtendedObject -->
</containsString>
```

Finally, custom logic may be specified for navigating the type of source model that relates to a rule. Custom logic may be used if the syntax of the rules is insufficient to describe certain criteria, the user may be allowed to hook their own code into the framework.

Custom logic may be used on a case by case basis to assist navigation through a file once it is located. For example, a file might contain a series of similar entries contributed by different elements in a model. Each of these may be considered to be a "match" (i.e. multiple matches in a single file) and this custom logic may assist the identification of each match.

This latter feature also allows the introduction of arbitrary XML extensions to the rule structure that the custom logic can handle.

A framework is provided that can process these types of rules, handling a base set of XML directives and delegating to custom logic as required, for the purpose of reverse engineering the contents of the file system in order to infer: a) material that is the output of a specific code generator; and b) subsets of that material that represent redundant clutter and may thus be automatically removed.

This framework may first scan the file system for matches on the fully qualified file name patterns. This makes use of embedded "named" wildcards (illustrated above by enclosing variables names with either % or %% symbols) which also brings a performance benefit since this technique is able to quickly identify irrelevant parts of the file system and thus reduce the amount of scanning.

To take the example pattern above, any top level folder that does not contain an immediate sub-folder named "src" can never yield a match and the process may move straight on to the next top level folder. Similarly, even though the package name portion of the pattern is of indeterminate length, unless a folder named "entity" is encountered there is no reason to scan further at the file level.

Assuming that a match for a fully qualified file name is found then the framework will have populated the named variables embedded in the file name pattern. To use the example above, a file such as:

MyProject/src/com/ibm/models/entity/EMyAddressExt-.java would have matched and inferred the following information:

```
Project=MyProject
PackageName=com/ibm/models
EntityExtension=MyAddress
```

The framework may now examine the matched file for compliance with additional directives that may be specified in the rule, for example checking for the presence of "signature" words or phrases and whether a Java file implements and/or extends specific classes. If it passes all these checks then there is reasonable certainty that this is (or contains) generated output.

In cases where the evidence is not compelling that the file was generated (for example, a "signature" may be missing or there may be tell tale signs of user customization with the word "not" appended to injected "@generated" tags) then the framework labels this match as "unverified" and will require manual confirmation in order to proceed with cleaning it up.

At this stage, the framework has a set of matches that it is confident have originated from a specific code generation application. It now infers source elements from the named variables (see above) populated by the scanning and matching process and attempts to resolve these in all applicable source models. Any source elements that cannot be resolved indicate that the associated file or part thereof is redundant and may be automatically cleaned. In this way the framework is able to ensure that generated output is always consistent with the source input.

Any file (Java class, XML, text, etc.) may be analyzed using the described method and system and using a customizable rules engine, it may be determined with a very high degree of accuracy whether or not the code was created by a particular type of code generator application and whether or not it is still relevant.

The described method and system provides the ability to reverse engineer model information from generated code in the absence of explicit coupling, and without relying on special editors to simultaneously keep both model and code aligned with each other. It also supports customizable rules that can be adapted to suit many different model-code generation scenarios.

The described method and system infer the input to a code generator from the generated output through the use of flexible rules that describe key aspects of the code generator's behavior.

There may be a large number of files present on the file system, all of which must be checked against a large number of different rules looking for matches. The described method is able to do this fast enough to get the process integrated into code generation.

The described method also includes mechanisms for ensuring that only code that was actually generated is changed. Specifically, a file or content from a file should not be removed just because it is similar to generated content.

Thus, as presented herein and according to a first aspect of the present invention there is provided a method for maintaining integrity of output of code generators comprising: determining a generated output which has been generated by a specific code generation application based on an original model; analyzing the generated output to infer contents of an inferred version of the original model; comparing the inferred version of the original model with a current version of the original model to detect differences in source elements; and using detected differences to identify redundant elements in the generated output.

Determining a generated output may include: inputting files or content of a file system and reverse engineering applying customized rules based on the operation of the specific code generation application to identify generated output.

Analyzing the generated output to infer contents of an inferred version of the original model may include reverse engineering the generated output applying customized rules based on the operation of the specific code generation application.

The customized rules may be based on rules that a specific code generation application uses for naming and/or content of the original model.

The customized rules may include a base set of directives and delegate to custom logic as required.

Files or content of a file system may be scanned for matches to a file name pattern defined in the customized rules, wherein the file name pattern is a fully qualified file name pattern and locates files matching the file name but not allowing matching of a directory. A defined file name pattern may include embedded named wildcards.

The scanning may include checking for compliance of a matched file name to one or more additional directives specified in the customized rules, wherein an additional directive includes a signature content in the form of an expected content.

A matched file name pattern having populated name variables may be used to infer source elements of the inferred version of the original model.

Comparing the inferred version of the original model with a current version of the original model to detect differences in source elements may include comparing the content of the inferred version of the original model with the content of the current version of the original model.

Comparing may include comparing the content and structure of the inferred version of the original model with the content and structure of the current version of the original model.

In one embodiment, comparing the inferred version of the original model with a current version of the original model to detect differences in source elements may include a rule by rule approach wherein data is scanned for each rule and the inferred model is partially created in memory to allow the comparison for that rule to take place.

In another embodiment, comparing the inferred version of the original model with a current version of the original model to detect differences in source elements may include constructing the entire inferred version of the original model in memory and carrying out a direct model to model comparison.

The method may include automatically archiving or deleting identified redundant elements in the generated output.

According to a second aspect of the present invention there is provided a system for maintaining integrity of output of code generators comprising: a generated output recognition component for determining a generated output which has been generated by a specific code generation application based on an original model; an inferred model generating component for analyzing the generated output to infer contents of an inferred version of the original model; a comparing component for comparing the inferred version of the original model with a current version of the original model to detect differences in source elements; and a clean-up component for using detected differences to identify redundant elements in the generated output.

The generated output recognition component for determining a generated output may include inputting files or content of a file system and reverse engineering applying customized rules based on the operation of the specific code generation application to identify generated output.

The inferred model generating component for analyzing the generated output to infer contents of an inferred version of the original model may include reverse engineering the generated output applying customized rules based on the operation of the specific code generation application.

The generated output recognition component may be for scanning files or content of a file system for matches to a file name pattern defined in the customized rules, wherein the file name pattern is a fully qualified file name pattern and locates files matching the file name but not allowing matching of a directory. A defined file name pattern may include embedded named wildcards.

In the generated output recognition component, the scanning may include checking for compliance of a matched file name to one or more additional directives specified in the customized rules, wherein an additional directive includes a signature content in the form of expected content.

In the generated output recognition component, a matched file name pattern having populated name variables may be used to infer source elements of the inferred version of the original model.

The clean-up component may be for automatically archiving or deleting identified redundant elements in the generated output.

According to a third aspect of the present invention there is provided a computer program product for maintaining integrity of output of code generators, the computer program product comprising: a computer readable storage medium readable by a processing circuit and storing instructions for execution by the processing circuit for performing a method according to the method of the first aspect of the present invention.

According to a fourth aspect of the present invention there is provided a computer program stored on a computer readable medium and loadable into the internal memory of a digital computer, comprising software code portions, when said program is run on a computer, for performing the method of the first aspect of the present invention.

According to a fifth aspect of the present invention there is provided a method substantially as described with reference to the figures.

According to an sixth aspect of the present invention there is provided a system substantially as described with reference to the figures.

The described aspects of the invention provide the advantage that it can be used to retrospectively analyze and correct the output of code generation applications without any need to modify the application itself.

The invention can take the form of an entirely hardware embodiment, an entirely software embodiment or an embodiment containing both hardware and software elements. In one embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Improvements and modifications can be made to the foregoing without departing from the scope of the present invention.

What is claimed is:

1. A method for maintaining integrity of output of a code generator, the method comprising:
   determining, by one or more processors, a generated output that has been generated by a specific code generation application based on an original model, wherein the original model is a structured model used to construct a software program, wherein the generated output is program code, and wherein the original model is extensible markup language (XML) code that is interpreted by the specific code generation application and converted into the program code of the generated output;
   analyzing, by one or more processors, the generated output to infer contents of an inferred version of the original model;
   comparing, by one or more processors, the inferred version of the original model with a current version of the original model to detect differences in source elements of the inferred version of the original model as compared to the current version of the original model; and using, by one or more processors, detected differences to identify redundant elements in the generated output, wherein the redundant elements are elements in the generated output that would not be produced in a cleaned generated output by the specific code generation application using the current model.

2. The method as claimed in claim 1, further comprising:
reverse engineering, by one or more processors, files, from a file system, that describe the generated output that has been generated by the specific code generation application based on the original model, wherein said reverse engineering applies customized rules that are based on operations of the specific code generation application, and wherein said reverse engineering identifies the generated output that has been generated by the specific code generation application based on the original model.

3. The method as claimed in claim 2, wherein the customized rules include a base set of directives that delegate custom logic for said reverse engineering.

4. The method as claimed in claim 2, wherein the customized rules are based on rules that the specific code generation application uses for naming and/or content of the original model.

5. The method as claimed in claim 2, wherein the files from the file system are scanned for matches to a file name pattern defined in the customized rules, wherein the file name pattern is a fully qualified file name pattern that locates files by matching a file name but not allowing matching of a directory.

6. The method as claimed in claim 5, wherein a defined file name pattern includes embedded named wildcards.

7. The method as claimed in claim 5, wherein scanning files from the file system includes checking for compliance of a matched file name to one or more additional directives specified in the customized rules, wherein an additional directive includes a signature content in a form of an expected content.

8. The method as claimed in claim 5, wherein a matched file name pattern having populated name variables is used to infer source elements of the inferred version of the original model.

9. The method as claimed in claim 1, wherein said comparing the inferred version of the original model with the current version of the original model to detect differences in source elements includes comparing content of the inferred version of the original model with content of the current version of the original model.

10. The method as claimed in claim 1, wherein said comparing the inferred version of the original model with the current version of the original model to detect differences in source elements includes a rule by rule approach, wherein data is scanned using each rule from a plurality of rules, and wherein the inferred model is partially created in memory to allow said data to be scanned using said plurality of rules.

11. The method as claimed in claim 1, wherein comparing the inferred version of the original model with a current version of the original model to detect differences in source elements includes:
constructing, by one or more processors, an entire version of the inferred version of the original model in memory; and
carrying out, by one or more processors, a direct model to model comparison between the inferred version of the original model and the current version of the original model.

12. The method as claimed in claim 1, further comprising:
automatically archiving, by one or more processors, identified redundant elements in the generated output.

13. The method of claim 1, further comprising:
identifying, by one or more processors, a specific term in the generated output;
scanning, by one or more processors, the inferred version of the original model for the specific term; and
in response to determining that the specific term is not located in the inferred version of the original model, determining, by one or more processors, that the inferred version of the original model was not used by the specific code generation application to generate the generated output.

14. A system for maintaining integrity of output of a code generator, the system comprising:
a generated output recognition hardware component for determining a generated output which has been generated by a specific code generation application based on an original model, wherein the original model is a structured model used to construct a software program, wherein the generated output is program code, and wherein the original model is extensible markup language (XML) code that is interpreted by the specific code generation application and converted into the program code of the generated output;
an inferred model generating hardware component for analyzing the generated output to infer contents of an inferred version of the original model;
a comparing hardware component for comparing the inferred version of the original model with a current version of the original model to detect differences in source elements of the inferred version of the original model as compared to the current version of the original model; and
a clean-up hardware component for using detected differences to identify redundant elements in the generated output, wherein the redundant elements are elements in the generated output that would not be produced in a cleaned generated output by the specific code generation application using the current model.

15. The system as claimed in claim 14, wherein the generated output recognition hardware component for determining a generated output includes a hardware subcomponent for inputting files or content of a file system and reverse engineering by applying customized rules based on an operation of the specific code generation application to identify generated output.

16. The system as claimed in claim 14, wherein the inferred model generating hardware component for analyzing the generated output to infer contents of the inferred version of the original model includes a hardware subcomponent for reverse engineering the generated output by applying customized rules based on an operation of the specific code generation application.

17. A computer program product for maintaining integrity of output of a code generator, the computer program product comprising a non-transitory computer readable storage medium having program code embodied therewith, the program code readable and executable by a processor to:
determine a generated output that has been generated by a specific code generation application based on an original model, wherein the original model is a structured model used to construct a software program, wherein the generated output is program code, and wherein the original model is extensible markup language (XML) code that is interpreted by the specific code generation application and converted into the program code of the generated output;

analyze the generated output to infer contents of an inferred version of the original model;

compare the inferred version of the original model with a current version of the original model to detect differences in source elements of the inferred version of the original model as compared to the current version of the original model; and use detected differences to identify redundant elements in the generated output, wherein the redundant elements are elements in the generated output that would not be produced in a cleaned generated output by the specific code generation application using the current model.

18. The computer program product of claim 17, wherein the program code is further readable and executable by the processor to:

reverse engineer files, from a file system, that describe the generated output that has been generated by the specific code generation application based on the original model, wherein said reverse engineering applies customized rules that are based on operations of the specific code generation application, and wherein said reverse engineering identifies the generated output that has been generated by the specific code generation application based on the original model.

19. The method as claimed in claim 2, further comprising:

scanning, by one or more processors, contents of the file system for fully qualified file name patterns, wherein the fully qualified name patterns identify storage locations of files; and matching, by one or more processors, the fully qualified file name patterns to the source elements in the inferred version of the original model.

20. The method as claimed in claim 1, further comprising:

automatically deleting, by one or more processors, identified redundant elements in the generated output.

\* \* \* \* \*